Feb. 10, 1925. 1,526,306

G. W. SPRENGER

DAMPING MECHANISM FOR INSTRUMENTS

Filed April 19, 1924

Inventor:
George W. Sprenger,
by Alexander F. ———
His Attorney.

Patented Feb. 10, 1925.

1,526,306

UNITED STATES PATENT OFFICE.

GEORGE W. SPRENGER, OF LYNN, MASSACHUSETTS, ASSIGNOR TO GENERAL ELECTRIC COMPANY, A CORPORATION OF NEW YORK.

DAMPING MECHANISM FOR INSTRUMENTS.

Application filed April 19, 1924. Serial No. 707,728.

*To all whom it may concern:*

Be it known that I, GEORGE W. SPRENGER, a citizen of the United States, residing at Lynn, in the county of Essex, State of Massachusetts, have invented certain new and useful Improvements in Damping Mechanism for Instruments, of which the following is a specification.

My invention relates to damping devices for measuring instruments and the manner of attaching such devices to the movable part of the instrument.

One of the most effective damping devices for measuring instruments comprises a vane or paddle arranged to be moved by the part of the instrument to be damped and operating in a damping chamber containing a suitable damping fluid. Two problems are involved in the successful design of such a device: First, a complete closure of the damping chamber so as to prevent the spilling and evaporation of the damping fluid and to prevent dirt from entering the chamber; and second, a mechanical connection between the damping vane and the movable part of the instrument which is as near frictionless as possible and which is substantially free from lost motion. These problems are necessarily related since the main difficulty consists in transferring the mechanical movement of the instrument which is outside the damping chamber to the damping vane which is inside the chamber while maintaining a heremetically tight closure of the chamber.

My invention relates to the design of a damping device in which these problems are solved satisfactorily. Other advantages of my invention will appear as the description proceeds. In carrying my invention into effect I hermetically seal the damping chamber with a soft flexible membrane. The mechanical connection between the exterior and the interior moving parts of the damping device is made through this closure and the motion transmitting lever is pivoted in the plane of the diaphragm so that the movement of the lever will cause the least possible distortion of the diaphragm which is made sufficiently loose and thin to permit such motion to take place without appreciable friction.

The features of my invention which I believe to be novel and patentable will be pointed out in the claims appended hereto.

Figure 1:
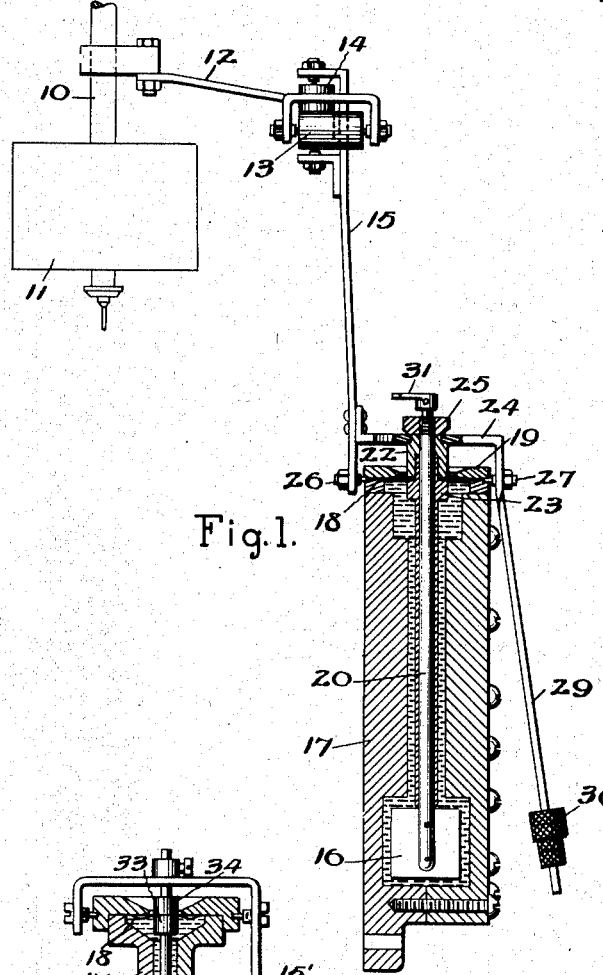
Figure 2:
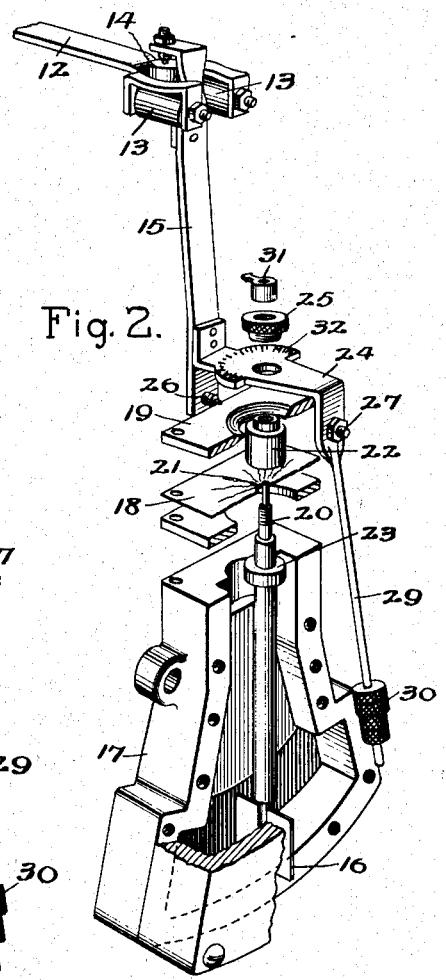
Figure 3:
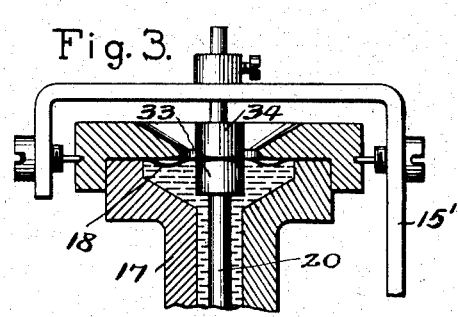

For a better understanding of my invention reference is made in the following description to the accompanying drawing. Fig. 1 of which shows a section taken through a damping chamber built in accordance with my invention and showing the connections thereof to the instrument shaft; Fig. 2 shows an exploded view of the parts shown in Fig. 1; Fig. 3 is a detail view, partially in section, of the manner of closing the damping chamber with a flexible membrane; and Figs. 4 and 4ª show a modification of the connection between the instrument shaft and the damping device.

Referring now more in particular to Figs. 1 and 2, 10 indicates the shaft of the instrument to be damped. The instrument indicated at 11 may be an electrical instrument of the graphic or indicating type and since it constitutes no part of my invention, it will not be further described. Rigidly, but preferably adjustably secured to the shaft 10, is a radially extending arm 12 having a forked outer end provided with spaced rollers 13. These rollers cooperate with an intermediate roller 14 having its axis at right angles to the first mentioned rollers. The roller 14 is secured to the upper end of the lever 15 leading to the damping device. The damping vane 16 is contained in a fan shaped damping chamber 17 of any suitable construction and material. The chamber is shown as being made up of two concave sections tightly bolted together leaving an opening in the top. The lower portion of the chamber thus formed is enlarged and shaped to accommodate the swinging movement of the damping vane 16.

The opening at the top of the damping chamber is hermetically sealed with a thin flexible membrane 18 of soft, durable material. I have found gut suitable for this purpose but do not wish to be limited thereto. A suitable washer 19 secures the membrane in position across the opening in the upper end of the chamber. The damping vane 16 is carried on the lower end of a rod 20 which passes up through an opening 21 in the central portion of the membrane 18 a sufficient distance away from the place where the membrane is secured by the washer 19 to allow the membrane freedom of movement and the membrane is made fairly loose (see Fig. 3) for this purpose. The opening thus made in the membrane is hermetically sealed by washers 22 and 23 on rod 20. The membrane is inserted between these washers and firmly held thereby. The upper end of rod 20 is secured to a cross bar 24 by means of a nut 25. In the modification shown in Figs. 1 and 2, the collars 22 and 23 are clamped between member 24 and the vane 16 by means of nut 25 and the various parts are held in place on the rod 20 by this means. Other equivalent arrangements for holding the parts in the desired relation may be used. The cross bar 24 is rigidly attached to the lever arm 15 and the whole is pivoted to the chamber 17 in the plane of the diaphragm 18 by means of pivot members 26 and 27.

From the foregoing description, it will be evident that the damping chamber 17 is hermetically sealed so that the damping fluid contained therein cannot spill out or evaporate or become contaminated by the seeping in of dirt or other foreign matter. Furthermore, the movable portion of the damping device is freely pivoted on an axis passing through the plane of the diaphragm so that it may be oscillated by the arm 12 extending from the instrument shaft with a minimum of distortion of the thin membrane. The roller connection between the arm 12 and the lever 15 permits the arm 12 to oscillate in a horizontal plane and the lever 15 in a vertical plane about their respective pivots with a minimum of friction and without lost motion over the deflection range of the instrument. The angle of deflection of the damping vane may, if desired, be made somewhat less than the deflection angle of the instrument by properly proportioning the relative lengths of arm 12 and the upper end of lever 15.

For the damping fluid, I prefer to use mercury although any other suitable fluid may be used and in order to protect the thin membrane 18 from shocks which might occur during shipment due to the mercury pressing against the membrane, I prefer to extend the washer 19 out over the membrane in the manner illustrated. When mercury is used as the damping fluid it is preferable to provide a counterweight arm 29 provided with adjustable weights 30 which arm is secured to the movable part of the device in the position shown for counterbalancing the buoyancy effect of the mercury.

The upper end of the rod 20 is preferably provided with a pointer 31 which cooperates with a scale 32 on the crossarm 24 to indicate the angular position of the vane 16 with respect to the channel in which it swings. By slightly loosening nut 25 and turning rod 20 and pointer 31, the vane 16 may be set at any desired angle so as to vary the clearance between it and the walls of the chamber. By this means different degrees of damping may be obtained. Thus, a maximum damping effect is produced when the vane is set at right angles to the side walls of the chamber and practically no damping effect is produced when the vane is set parallel to the walls of the chamber.

In Fig. 3 I have shown the arrangement of the flexible diaphragm more in detail and a slightly different arrangement of the associated parts. In this modification the central portion of the diaphragm is held between two nuts 33 and 34 threaded on rod 20. The outer edges of the nuts 33 and 34 adjacent to the membrane, as well as the upper edge of the inner wall of the chamber 17 adjacent the membrane, are preferably rounded off slightly so as not to cut or chafe the membrane. The corresponding parts of Figs. 2 and 3 are also preferably rounded off for this purpose.

Figures 4, 4A:
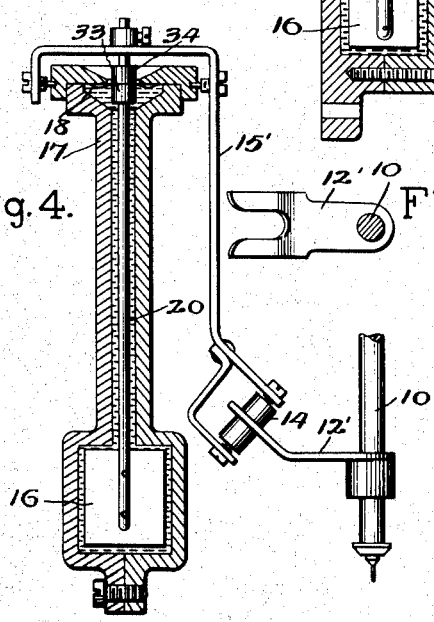

In Fig. 4 I have shown a different arrangement of the connection between the instrument shaft 10 and the lever arm 15'. In this modification the rollers are omitted from the arm 12' extending from the shaft 10 and the outer end of this arm is provided with a simple fork enclosing the roller 14 on lever 15'. A top view of the forked arm 12' is shown in Fig. 4ᵃ. Other equivalent arrangements may be used.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. A damping device for instruments comprising a chamber containing a damping fluid, a damping vane therein, a flexible membrane closing said chamber and an operating lever for said damping vane passing through said membrane and pivoted in the plane of said membrane.

2. In a device of the character described, a chamber, a flexible membrane hermetically sealing an opening in said chamber, and a lever passing through said membrane for conveying motion therethrough, said lever being pivoted in the plane of said membrane.

3. A damping device for instruments comprising a chamber containing a damping fluid, a damping vane therein, a flexible membrane closing said chamber, and a lever arm for said damping vane passing through said membrane, said lever being pivoted on the exterior of said chamber for rotation about a single axis lying in the plane of said membrane.

4. A hermetically tight closure for vessels which permits the transfer of mechanical movement therethrough without appreciable friction, comprising in combination with the vessel a flexible membrane loosely secured across an opening in the vessel, a lever arm pivoted in the plane of the membrane and passing through the membrane at a point spaced away from the walls of the vessel and collars on said lever on opposite sides of said membrane securing the membrane to the lever arm and hermetically sealing the opening in the membrane through which the lever passes, said collars having rounded off outer edges adjacent the membrane to prevent chafing of the latter when the lever is moved.

5. An instrument shaft and means for damping the movements of said shaft comprising a damping vane pivoted for movement about an axis lying at an angle to the axis of rotation of said shaft, a lever extending from said vane, an arm extending from said shaft, a roller on one of said extending members and a fork on the other of said extending members embracing said roller.

6. An instrument shaft and means for damping the movements of said shaft comprising a damping vane pivoted for movement about an axis lying substantially at right angles to the axis of rotation of said shaft, arms respectively secured to said vane and said shaft and extending radially from their respective axes of rotation, a pair of spaced rollers on the extremity of one of said arms and a roller on the extremity of the other of said arms lying between and at substantially right angles to the first mentioned rollers and in contact therewith.

7. A damping device for instruments comprising a chamber containing mercury, a damping vane in said chamber, a pivoted lever secured to said vane and extending out of said chamber and means secured to said lever outside of said chamber for counterbalancing the buoyancy effect of the mercury on said vane.

8. A damping device for instruments comprising a hermetically sealed chamber containing a damping fluid, a damping vane in said chamber, a lever secured to said vane and extending out of said chamber, said lever being pivoted to permit said vane to swing in said chamber and means exterior of said chamber for adjusting the angular position of said vane with respect to the plane in which it swings.

9. In combination, a measuring instrument having a movable member, a damping device therefor comprising a hermetically sealed chamber containing a damping fluid, a damping vane pivoted to swing in said chamber and means for mechanically connecting said damping vane to the movable member of said instrument.

In witness whereof, I have hereunto set my hand this seventeenth day of April, 1924.

GEORGE W. SPRENGER.